United States Patent
Song et al.

(10) Patent No.: US 10,852,850 B2
(45) Date of Patent: Dec. 1, 2020

(54) ADJUSTABLE STYLUS PEN

(71) Applicant: HEWLETT-PACKARD DEVELOPMENT COMPANY, L.P., Spring, TX (US)

(72) Inventors: Ki Bok Song, Spring, TX (US); Ilchan Lee, Spring, TX (US); Dong Ryul Cha, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/291,378

(22) Filed: Mar. 4, 2019

(65) Prior Publication Data
US 2019/0196611 A1 Jun. 27, 2019

Related U.S. Application Data

(63) Continuation of application No. 15/114,060, filed as application No. PCT/US2014/013726 on Jan. 30, 2014, now abandoned.

(51) Int. Cl.
G06F 3/0354 (2013.01)

(52) U.S. Cl.
CPC .................. G06F 3/03545 (2013.01)

(58) Field of Classification Search
CPC ...... G06F 3/0414; G06F 3/0386; G06F 3/042; G06F 3/014; G06F 3/03545
See application file for complete search history.

(56) References Cited

U.S. PATENT DOCUMENTS

| | | | |
|---|---|---|---|
| 5,717,435 A | 2/1998 | Fukushima et al. | |
| 5,850,059 A | 12/1998 | Yoshimura | |
| 5,864,098 A | 1/1999 | Shinohe | |
| 6,130,666 A | 10/2000 | Persidsky | |
| 6,336,761 B1 | 1/2002 | Kudo | |
| 6,556,190 B2 | 4/2003 | Fleck et al. | |
| 6,882,340 B2 | 4/2005 | Kanzaki et al. | |
| 2001/0006383 A1 | 7/2001 | Fleck et al. | |
| 2007/0189832 A1* | 8/2007 | Yeh | B43K 27/08 401/32 |
| 2009/0309854 A1 | 12/2009 | Hildebrandt et al. | |
| 2010/0182285 A1* | 7/2010 | Tremblay | G06F 3/038 345/179 |
| 2011/0169756 A1 | 7/2011 | Ogawa | |

(Continued)

FOREIGN PATENT DOCUMENTS

| | | |
|---|---|---|
| CN | 103440051 | 12/2013 |
| CN | 103543851 | 1/2014 |

(Continued)

*Primary Examiner* — Yuzhen Shen
(74) *Attorney, Agent, or Firm* — Fabian VanCott

(57) ABSTRACT

An example stylus pen including a body includes a central axis, a first end, and a second end. In addition, the stylus pen includes an engagement tip disposed at the first end and including resilient cover. Further, the stylus pen includes an adjustment mechanism at least partially disposed within the body and arranged such that manipulation of the adjustment mechanism by a user causes the cover of the engagement tip to actuate between a first shape and a second shape. The cover of the engagement tip is arranged to engage with a touch sensitive surface to cause a change in a computing device when in either one of the first shape and the second shape.

20 Claims, 6 Drawing Sheets

(56) References Cited

U.S. PATENT DOCUMENTS

| | | |
|---|---|---|
| 2011/0273376 A1 | 11/2011 | Dickinson et al. |
| 2012/0146957 A1 | 6/2012 | Dunagan |
| 2012/0194484 A1 | 8/2012 | Lehman |
| 2012/0331546 A1 | 12/2012 | Falkenburg et al. |
| 2013/0038579 A1 | 2/2013 | Boyd et al. |
| 2013/0076701 A1* | 3/2013 | Wu .................... G06F 3/03545 345/179 |
| 2013/0141400 A1* | 6/2013 | Chen ...................... G06F 3/039 345/179 |
| 2014/0015810 A1 | 1/2014 | Chau |
| 2014/0015811 A1 | 1/2014 | Ji et al. |
| 2014/0078109 A1 | 3/2014 | Armstrong-Muntner |
| 2015/0212601 A1 | 7/2015 | Zerayohannes |
| 2016/0154486 A1* | 6/2016 | Ogata ................... G06F 3/0383 345/179 |

FOREIGN PATENT DOCUMENTS

| | | |
|---|---|---|
| KR | 10-2010-0027255 | 3/2010 |
| WO | WO-2010079895 | 7/2010 |
| WO | WO-2012145226 | 10/2012 |

\* cited by examiner

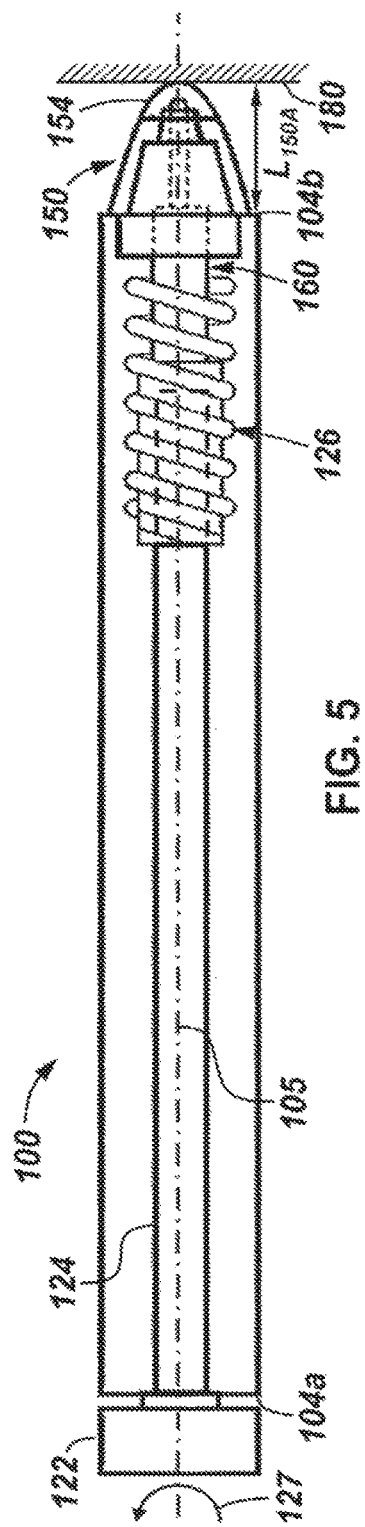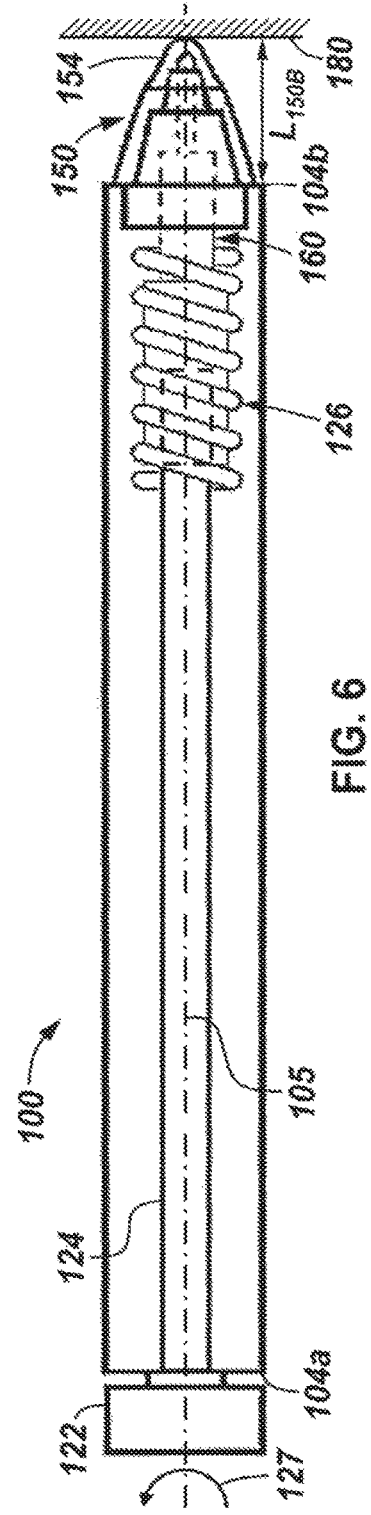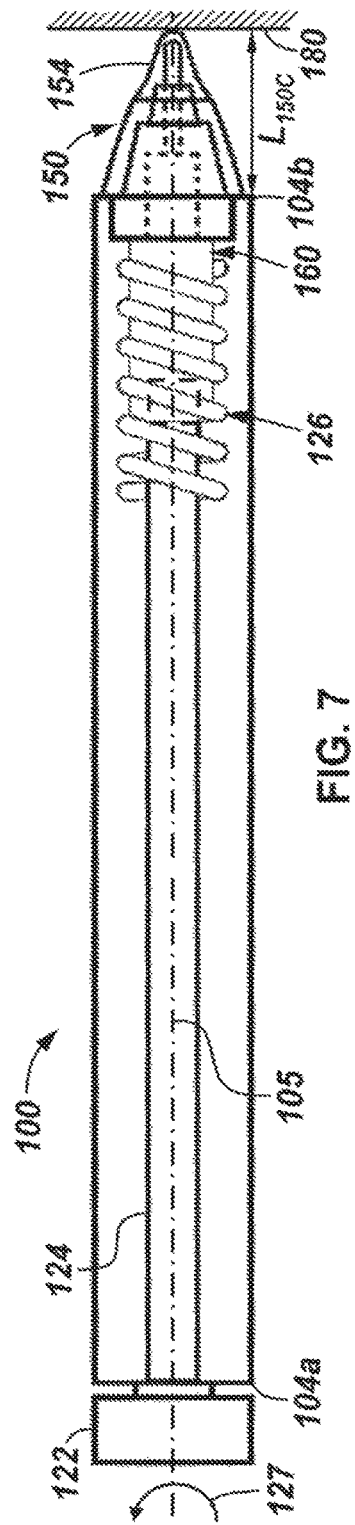

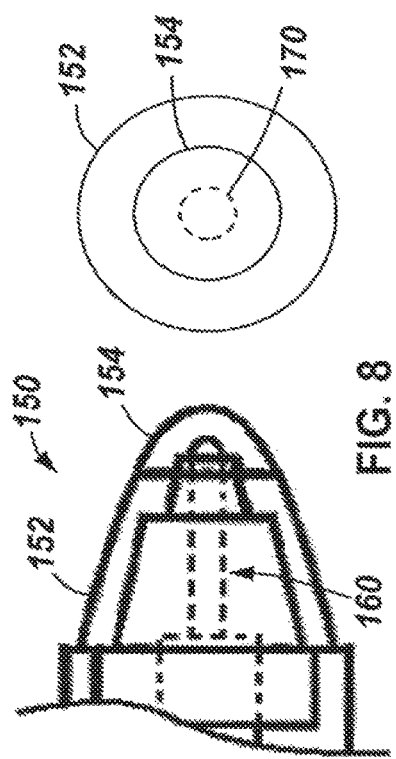
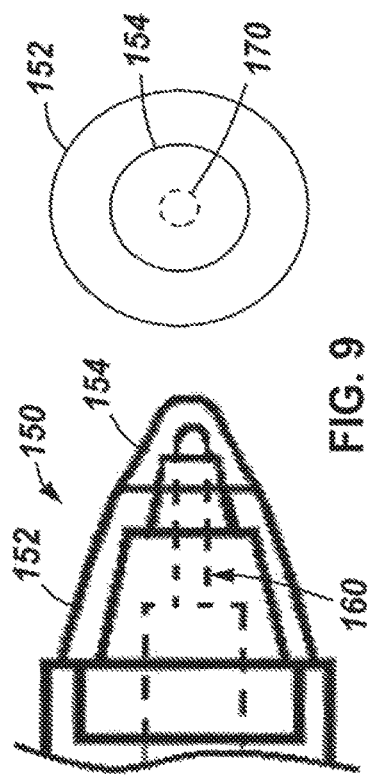
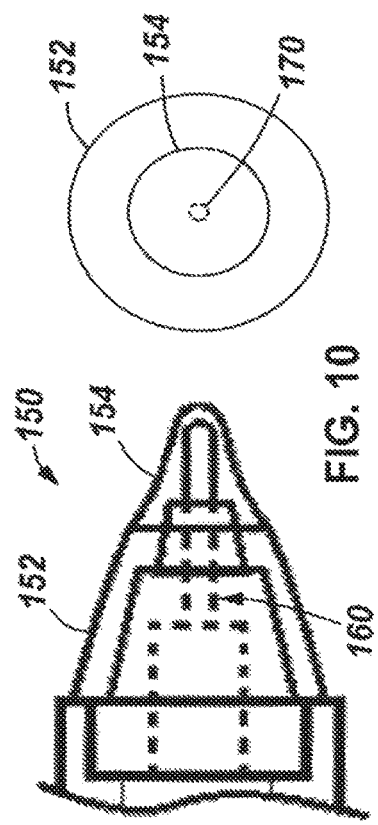

ADJUSTABLE STYLUS PEN

BACKGROUND

Touch sensitive technology is extremely prevalent in modern computing devices (e.g., personal computers, smartphones, tablets, all-in-one computers, etc.). As a result, a user typically interacts with such a device by physically touching or engaging with a touch sensitive surface (e.g., a touch sensitive display or touch pad). In some instances, a user will engage the touch sensitive surface with a stylus pen.

BRIEF DESCRIPTION OF THE DRAWINGS

For a detailed description of various examples, reference will now be made to the accompanying drawings in which:

FIGS. 5-7 show sequential schematic side partial cross-sectional views of the stylus pen of FIG. 1 with the tip being adjusted from a relatively dull shape to a sharper shape in accordance with the principles disclosed herein; and FIGS. 8-10 show enlarged sequential schematic side views of the engagement tip of the stylus pen of FIG. 1 being adjusted from a relatively dull shape to progressively sharper shapes in accordance with the principles disclosed herein.

NOTATION AND NOMENCLATURE

Certain terms are used throughout the following description and claims to refer to particular system components. As one skilled in the art will appreciate, a single component may be referred to by different names. This document does not intend to distinguish between components that differ in name but not in function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

DETAILED DESCRIPTION

The following discussion is directed to various examples. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be explanatory of that example, and not intended to intimate that the scope of the disclosure, including the claims, is limited to that example.

Figure 1:
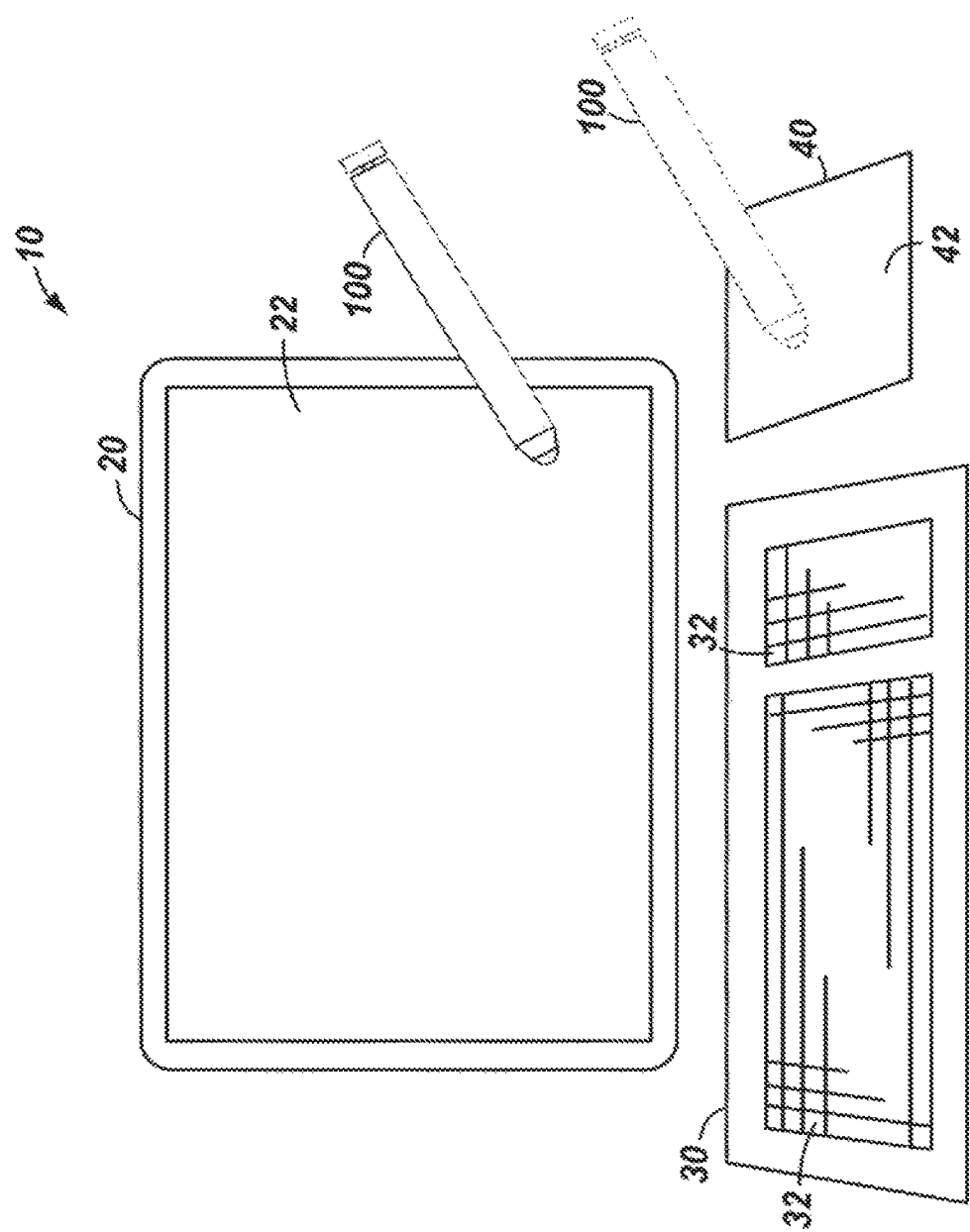
FIG. 1 shows a schematic view of a computing system including an adjustable stylus pen in accordance with the principles disclosed herein.

Referring now to FIG. 1, wherein an example computing system 10 is shown. In this example, computing system 10 includes a computing device 20, a keyboard 30, a touchpad 40, and an adjustable stylus pen 100 in accordance with the principles disclosed herein.

Computing device 20 may comprise any suitable device or assembly of devices that is arranged to execute software, such as, for example, an all-in-one computer, a laptop, a smartphone, a tablet computer, etc. In this example, computing device 20 comprises an all-in-one computer that includes a display 22 that shows images thereon for viewing by a user (not shown). In this example, display 22 is touch sensitive.

Keyboard 30 is electrically coupled to computing device 20 (e.g., through a conductor and/or wireless connection) and is arranged such that a user may interact with computing device 20 by engaging one or more keys 32 that are disposed thereon. Touch pad 40 is also electrically coupled to computing device (e.g., through a conductor and/or wireless connection) and includes a touch sensitive surface 42.

During operations, a user (not shown) may interact with computing device 20 by engaging touch sensitive surface 42 of touch pad 40 and/or display 22 with the stylus pen 100 in order to cause a change within computing device 20. Surface 42 and display 22 may each include any suitable touch sensitive technology known in the art while still complying with the principles disclosed herein, such as, for example, resistive, capacitive, acoustic wave, infrared (IR), strain gauge, optical, acoustic pulse recognition, or some combination thereof.

When utilizing stylus pen 100 to interact with a touch sensitive surface (e.g., display 22 and/or surface 42), it is often desirable to use a wide variety of tip sizes and/or shapes. For example, a user who is running a drawing or drafting program on computing device 20 may wish to change the sharpness of the resulting line(s) and/or point(s) produced and shown on the display 22. In many such drafting or drawing programs, such a change may be made through manipulation of various controls within the software itself, a procedure that is often cumbersome and difficult for some users. Thus, various examples of stylus pen 100 having an adjustable tip are disclosed herein. As will be described in more detail below, through use of stylus pen 100 in accordance with the principles disclosed herein, a user may simply manipulate an adjustment mechanism disposed on the stylus pen itself to effect a change in the engagement tip size and/or shape and thus the sharpness of the resulting line(s) and/or point(s) shown on the display. Thus, through use of a stylus pen in accordance with the principles disclosed herein (e.g., pen 100), a user's experience is greatly simplified.

Figure 2:
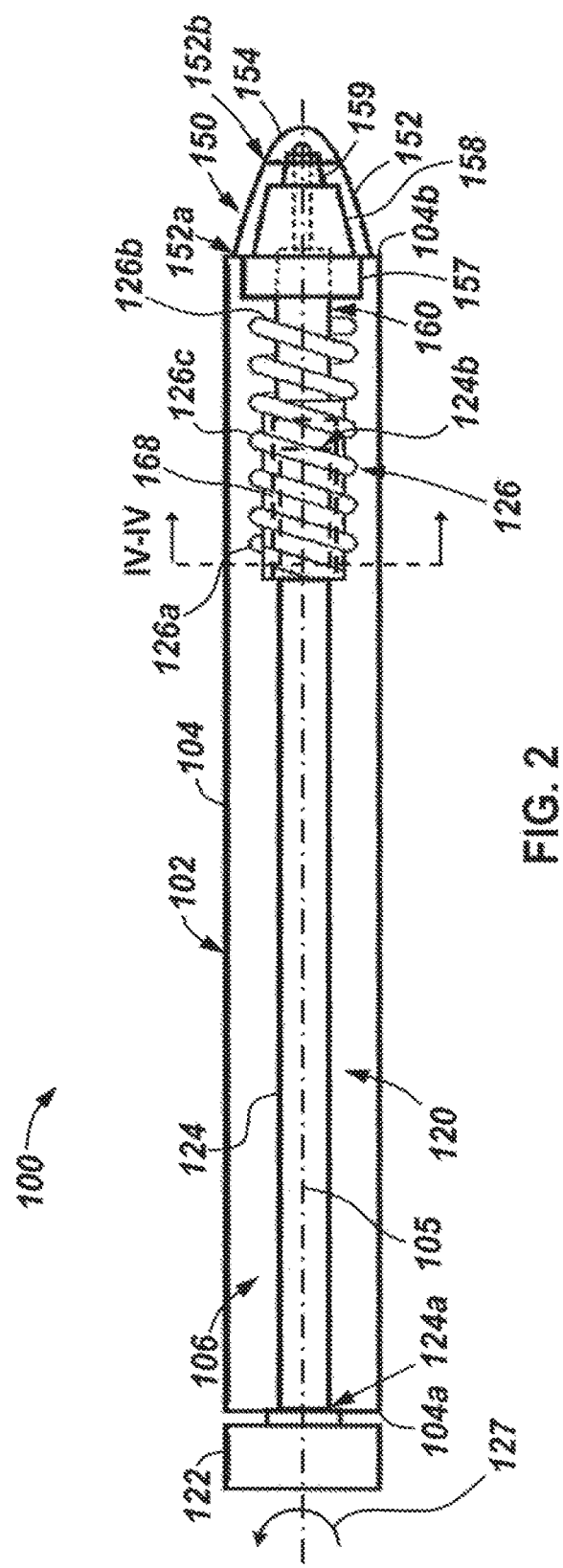
FIG. 2 shows a schematic side partial cross-sectional view of a stylus pen with an adjustable tip in accordance with the principles disclosed herein.

Referring now to FIG. 2, wherein stylus pen 100 is shown. Pen 100 generally includes a body 102, an engagement tip 150, and an adjustment mechanism 120 disposed partially within body 102. Body 102 includes an elongate hollow member or tube 104 that further includes a central or longitudinal axis 105, a first or proximal end 104a, a second or distal end 104b opposite the proximal end 104a, and a central throughbore 106 extending axially between the ends 104a, 104b. In this example, body 102 is generally sized and formed such that a user may comfortably grip body 102 with their hand in a manner similar to that of a typical writing pen or pencil.

Engagement tip 150 is generally disposed at the distal end 104b of tube 104 and includes a funnel 152, a resilient cover 154, an elongate internal extension member 160, and a plurality of internal guides 157, 158, 159. In this example, funnel 152 is generally frustoconical in shape and includes a first or proximal end 152a and a second or distal end 152b opposite the proximal end 152a. In addition, funnel 152 is generally hollow such that it is open at each of the ends 152a, 152b. Funnel 152 is coupled body 102 such that proximal end 152a abuts or engages the distal end 104b of tube 104 and distal end 152b extends outwardly therefrom along axis 105.

Resilient cover 154 is mounted to the distal end 152b of funnel 152 such that cover 154 occludes the opening at the distal end 152b. Cover 154 may comprise any suitable resilient material that may be engaged with a touch sensitive surface while still complying with the principles disclosed herein. In this example, cover 154 comprises a thermoplastic urethane (TPU).

Guides 157, 158, 159 extend within tube 104, funnel 152, and cover 154 and each includes an open central passage (not shown). As will be described in more detail below, guides 157, 158, 159 are arranged to guide or direct extension member 160 as it advances axially through body 102. Guides 157, 158, 159 may be secured within body 102 through any suitable method or device while still complying with the principles disclosed herein. For instance, in some examples, funnel 152 and guide 157 are secured to one another such as, for example, through sonic welding or heat staking, and guide 157 is threadably engaged with the distal end 104b of tube 104. In addition, in these examples, guides 158, 159 are each placed within funnel 152 such that each may slide or translate axially relative to funnel 152 and guide 157 during operations. It should also be appreciated that in some examples, one or more of the guides 157, 158, 159 are not included with pen 100 while still complying with the principles disclosed herein.

Figure 3:
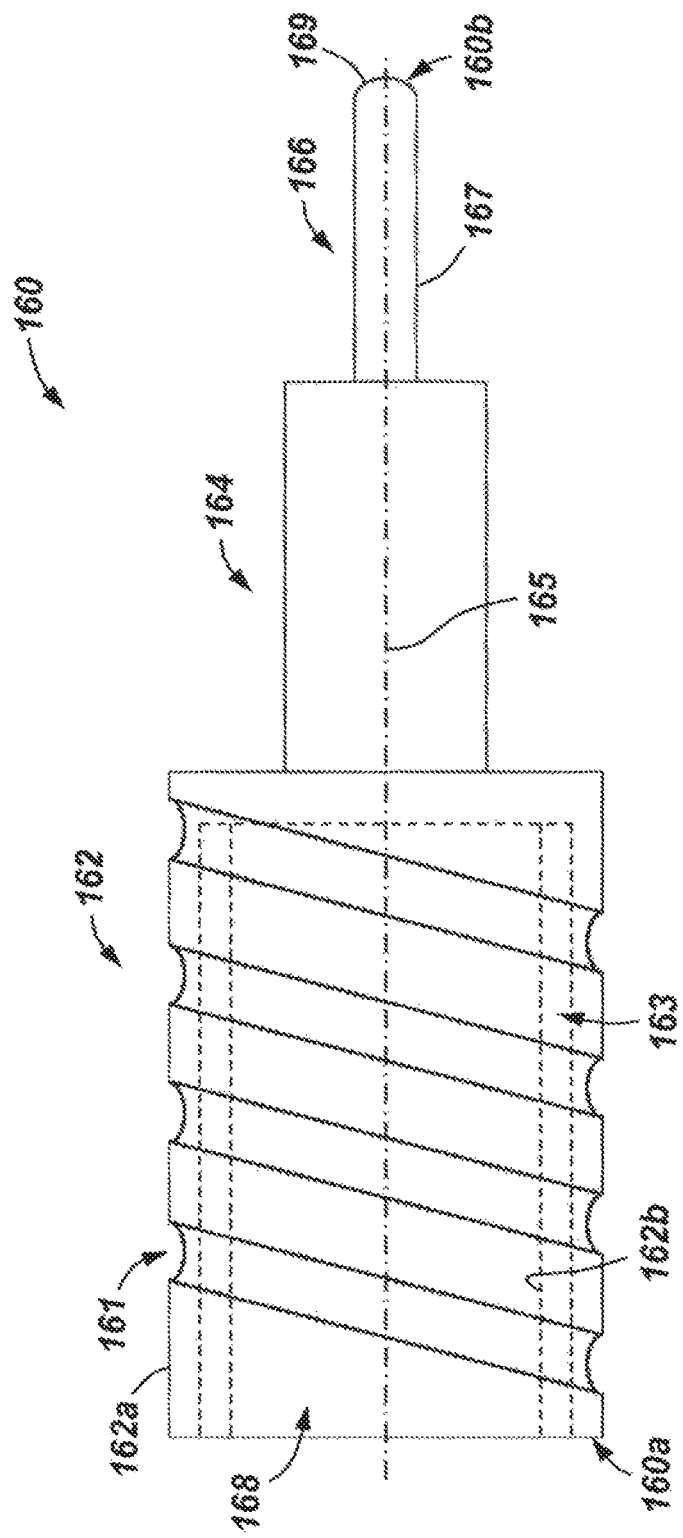
FIG. 3 shows a side view of the extension member of the stylus pen of FIG. 1 in accordance with the principles disclosed herein.

Referring now to FIG. 3, extension member 160 generally includes a central or longitudinal axis 165 that is aligned with the axis 105 of pen 100 when fully inserted therein, a first or proximal end 160a, a second or distal end 160b opposite the proximal end 160b, a barrel section 162 extending axially from the proximal end 160a, an extension section 166 extending axially from the distal end 160a, and a connection section 164 extending axially from the barrel section 162 to the extension section 166.

Barrel section 162 includes a radially outer surface 162a and a recess 168 extending axially from the proximal end 160a that is substantially defined by a radially inner surface 162b. In this example, surfaces 162a, 162b are generally cylindrical in shape; however, it should be appreciated that in other examples one or both of the surfaces 162a, 162b may be formed in one or more other shapes, such as, for example, rectangular, pentagonal, hexagonal, octagonal, polygonal, or some combination thereof while still complying with the principles disclosed herein. In addition, barrel section 162 also includes a groove 161 that extends radially inward from the radially outer surface 162a and wraps helically about section 162. Thus, groove 161 may be referred to herein as "helical groove" 161. Further, in this example, recess 168 includes a pair of axially oriented grooves 163 which extend radially outward from the surface 162b.

In this example, connection section 164 is generally cylindrical in shape and extends axially between the barrel section 162 and extension section 166. In other examples, connection member 164 may be formed in a number of different shapes, such as, for example, rectangular, pentagonal, hexagonal, octagonal, polygonal, or some combination thereof. In addition, it should also be appreciated that in some examples, no connection member 164 is included while still complying with the principles disclosed herein.

Referring still to FIG. 3, extension member 166 is an elongate member having a tip or end 169 disposed at the distal end 160b of member 160. As will be explained in more detail below, as extension member 160 translates axially within tube 104, end 169 of section 166 engages with cover 154 to change the shape of cover 154 from dull to relatively sharp.

Referring back now to FIG. 2, adjustment mechanism 120 includes a user interaction mechanism 122, an elongate rod 124 extending into throughbore 106 from mechanism 122, and a coil 126 disposed within throughbore 106. Interaction mechanism 122 may include any suitable mechanism for interaction with a user during use of the pen 100 while still complying with the principles disclosed herein. For example, in this example, mechanism 122 comprises a knob that is rotatably coupled to the proximal end 104a of tube 104 such that knob 122 may rotate or pivot about the axis 105 during operation. Accordingly, in the description to follow, user interaction mechanism 122 may also be referred to as knob 122.

Rod 124 includes a first or proximal end 124a and a second or distal end 124b opposite the proximal end 124a. Proximal end 124a is mounted to knob 122 such that as knob 122 rotates about axis 105, rod 124 also rotates about axis 105. In addition, the distal end 124b of rod 124 is slidingly received within the recess 168 of barrel section 162 of extension member 160. In at least some examples, end 124b of rod 124 is received within recess 168 such that member 160 is driven to rotate along with rod 124 and knob 122 about axis 105 while still allowing member 160 to translate axially relative to rod 124 with respect to axis 105. For instance, in this example, as is best shown in FIG. 4, rod 124 includes a pair of radial projections 128 that extend axially from or proximate distal end 124b such that when rod 124 is inserted within recess 168, the projections 128 each slidingly engage one of the recesses 163 to fix the relative angular positions of rod 124 and member 160.

Referring again to FIG. 2, coil 126 is wire-like structure that is secured within throughbore 106 of tube 104 and includes a first or proximal end 126a, a second or distal end 126b opposite the proximal end 126a, and a body 126c extending helically between the end 126a, 126b about the axis 105. In this example, coil 126 is secured within throughbore 106 such that its angular position with respect to the axis 105 is substantially fixed. Any suitable device or method for fixing coil 126 within throughbore 106 may be used while still complying with the principles disclosed herein. In addition, in this example, the helical body 126c of coil 126 is shaped and sized to correspond with the helical groove 161 on the barrel section 162 (see FIG. 3) of extension member 160.

Figure 4:
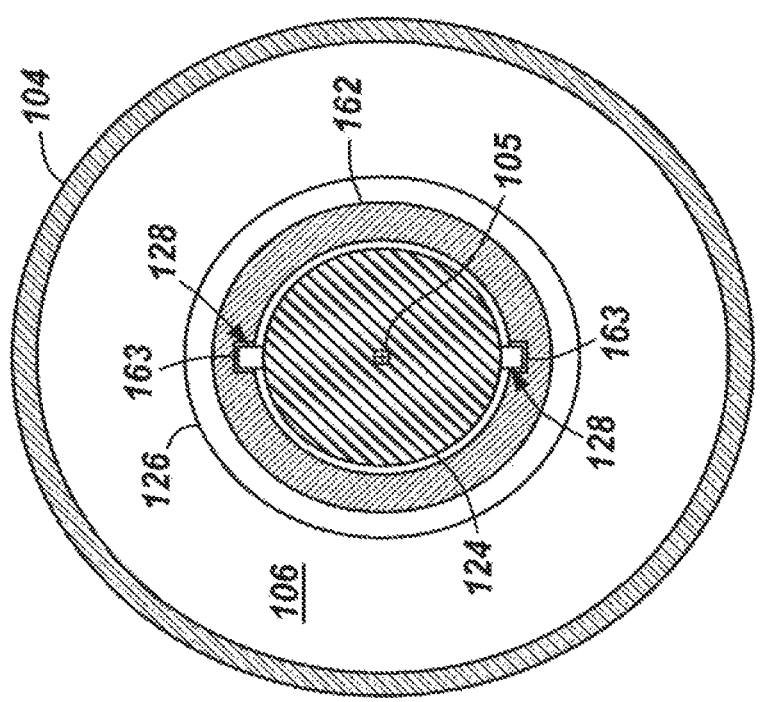
FIG. 4 shows a schematic cross-sectional view of the stylus pen along section IV-IV in FIG. 2 in accordance with the principles disclosed herein.

Referring now to FIGS. 2-4, during assembly of stylus pen 100, extension member 160 is inserted within throughbore 106 of tube 104 such that the end 169 of engagement section 166 extends through each of the guides 157, 158, 159 and abuts or is proximate cover 154. In addition, as extension member 160 is installed within throughbore 106 in the manner described, the body 126c of coil 126 engages the groove 163 on barrel section 162. Thereafter, rod 124 is inserted within throughbore 106 from the proximal end 104a such that the distal end 124b of rod 124 is inserted within recess 168 and projections 128 slidingly engage the recesses 161 in the manner described above (see FIG. 4). Thus, due to the engagement of coil 126 with groove 161, when extension member 160 rotates about the axis 105 along a direction 127 (see FIG. 2), body 126c slidingly engages with the groove 161 on member 160 and thus urges member 160 axially toward the distal end 104a (or to the right as shown in FIG. 2). Similarly, when extension member 160 is rotated about axis 105 in a direction that is opposite direction 127, body 126c on coil 126 urges member 160 axially toward the proximal end 104a (or to the left as shown in FIG. 2). In addition, knob 122 is coupled to proximal end 124a in the manner previously described such that each of the knob 122 and rod 124 are arranged to rotate in unison with one another about the axis 105 during operation.

Referring now to FIGS. 2 and 5-7, a user (not shown) may rotate knob 122 about the axis 105 in the direction 127. As knob 122 is rotated about the axis 105 in direction 127, rod 124 and extension member 160 (e.g., due to the engagement of the projections 128 on rod 124 and the recesses 163 within the recess 168 of extension member 160) each also rotate about axis 105 along the direction 127. As extension member 160 rotates in direction 127, body 126c of coil 126 slidingly engages with groove 161 on member 160 and urges member 160 axially toward distal end 104b and cover 154 in the manner previously described (see progression from FIG. 5 to FIG. 7). To axially withdrawn extension member 160 within tube 104, knob 122, rod 124, and thus extension member 160 are all rotated about the axis 105 in a direction that is opposite the direction 127 such that coil 126 urges extension member 160 toward the proximal end 104a (see the progression from FIG. 7 to FIG. 5). As is shown in FIGS. 5-7, as member 160 is axially moved toward the distal end 104b of tube 104, the end 169 of member 160 engages with and thereby deforms cover 154. As cover 154 is deformed, it changes shape from more dull (e.g., FIG. 5) to progressively more sharp (e.g., FIGS. 6 and 7). As a result, engagement tip 150 of pen 100 is actuatable between a plurality of positions wherein the shape of tip 150 is different at each position. In particular, pen 100 is actuatable, through manipulation of adjustment mechanism 120, between a plurality of positions wherein the shape of the engagement tip 150 ranges from dull to sharp.

In addition, as engagement tip 150 of pen 100 is actuated between relatively dull shapes to a relative sharp shapes, the axial length of tip 150 increases. In particular, as shown in FIG. 5, when tip 150 is in an initial position corresponding to a relatively dull shape, tip 150 has an axial length $L_{150A}$ measured axially from the proximal end 152a of funnel 152 to the distal most point of cover 154. Next, as shown in FIG. 6, as tip 150 is transitioned to a position corresponding to a relatively sharper shape, the tip 150 has an axial length $L_{150B}$ that is greater than the axial length $L_{150A}$ shown in FIG. 5. Similarly, as tip 150 is actuated to positions with progressively sharper shapes, such as is shown in FIG. 7, tip has an axial length $L_{150C}$ that is greater than each of the axial lengths $L_{150A}$, $L_{150B}$ shown in FIGS. 5 and 6, respectively.

Referring now to FIGS. 5-10, during use of pen 100 by a user, cover 154 on tip 150 is directly engaged with a touch sensitive surface 180 (e.g., touch sensitive display 22 or surface 42 of touch pad 40) with a portion of the total surface area of cover 154 that is referred to herein as an engagement surface or area 170 (See FIGS. 8-10). In other words, the engagement area 170 of cover 154 refers to the specific fractional portion of the outer surface of cover 154 that physically engages with the touch sensitive surface 180 during use of pen 100. In general, as member 160 is axially advanced through tube 104 such that cover 154 is deformed to form a sharper shape, the engagement area 170 between the cover 154 and the touch sensitive surface 180 necessarily decreases in size. In particular, as best shown in FIGS. 8-10, as engagement tip 150 is transitioned from a dull point (e.g., FIG. 8) to a relative sharp point (e.g., FIG. 10) the engagement area 170 contacting the touch sensitive surface (e.g., surface 180 shown in FIGS. 5-7) decreases in size. Thus, a user may manipulate the adjustment mechanism 120 of pen 100 to achieve a variety of relatively fine and dull shapes for engagement with the touch sensitive surface.

In the manner described, through use of a stylus pen in accordance with the principles disclosed herein (e.g., pen 100), a user may simply manipulate an adjustment mechanism (e.g., mechanism 120) disposed on the stylus pen itself to affect a change in the engagement tip shape (e.g., tip 150), thereby also affecting a change in the sharpness of the resulting line(s) and/or point(s) shown on the display (e.g., display 22) of the associated computing device (e.g., device 20). As a result, a user may affect such a change in the line(s) and/or point(s) shown on the display without needing to make cumbersome and difficult changes through the specific software being used such that the user's experience is greatly simplified.

While examples disclosed herein have included an extension member 160 that includes a cylindrical recess 168 that receives the distal end 124b of a substantially cylindrical rod 124, it should be appreciated that in other examples, rod 124 and recess 168 may each be formed in other corresponding shapes, such as, for example, rectangular, pentagonal, hexagonal, octagonal, polygonal, or some combination thereof. In addition, in at least some of these examples, recess 168 does not include the recesses 163 and rod 124 does not include projections 128 while still complying with the principles disclosed herein. Further, while examples disclosed herein have included an adjustment mechanism 120 that includes a rotatable knob 122, it should be appreciated that other types of adjustment mechanisms may be used to axially advance or withdrawn the extension member 160 relative to tube 104 while still complying with the principles disclosed herein. For instance, in some examples, adjustment mechanism 120 may comprise a button that is depressed to axially advance extension member 160 through an internal ratcheting system.

The above discussion is meant to be illustrative of the principles and various embodiments of the present disclosure. Numerous variations and modifications will become apparent to those skilled in the art once the above disclosure is fully appreciated.

What is claimed is:

1. A stylus pen comprising:
  a body including a central axis, a first end, and a second end;
  an engagement tip disposed at the first end and including resilient cover; and
  an adjustment mechanism at least partially disposed within the body and arranged such that manipulation of the adjustment mechanism by a user causes the cover of the engagement tip to actuate between a first shape and a second shape;
  wherein the adjustment mechanism comprises a barrel with a helical groove around an outer surface of the barrel, the adjustment mechanism further comprising a coil engaging the helical groove of the body;

wherein the adjustment mechanism further comprises an extension member to engage the cover such that the cover assumes the first shape or the second shape based on position of the extension member relative to the resilient cover, the extension member mechanically engaged with the barrel.

2. The stylus pen of claim 1, wherein relative movement between the barrel and the coil extends or retracts the extension member so that the engagement tip in the first shape has a sharper point than does the engagement tip in the second shape, the cover of the engagement tip to engage with a touch sensitive surface.

3. The stylus pen of claim 1, wherein the adjustment mechanism includes a knob rotatably disposed at the second end of the body.

4. The stylus pen of claim 3, wherein rotation of the knob causes the cover of the engagement tip to actuate between the first shape and the second shape.

5. The stylus pen of claim 1,
wherein relative movement between the barrel and the coil extends or retracts the extension member so that:
the first shape has a first engagement area when the tip is engaged with a touch sensitive surface; and
the second shape has a second engagement area when the tip is engaged with the touch sensitive surface;
wherein the first engagement area is larger than the second engagement area.

6. The stylus pen of claim 1, wherein the engagement tip has an axial length and wherein the axial length is increased when the cover of the engagement tip is actuated from the first shape to the second shape.

7. The stylus pen of claim 1, further comprising at least one conical guide to guide the extension member as the extension member advances axially into the resilient cover of the engagement tip.

8. The stylus pen of claim 1, further comprising a rod extending axially through the body between a user interaction mechanism and the extension member, the rod comprising radial projections that engage recesses to fix relative angular positions of the rod and the extension member.

9. The stylus pen of claim 1, wherein relative movement between the barrel and the coil extends or retracts the extension member so that between the first shape and the second shape, the extension member assumes a range of positions at which a shape of the engagement tip varies between relatively dull to relatively sharp.

10. The stylus pen of claim 1, further comprising a button that, when actuated, axially advances the extension member into the resilient cover.

11. A mechanism for controlling a shape of an engagement tip of a stylus pen, the mechanism comprising:
the engagement tip disposed at a first end of the mechanism to engage with a resilient cover; and
an adjustment mechanism arranged such that manipulation of the adjustment mechanism by a user causes axial movement of an extension member into or out of the cover of the engagement tip to actuate through a range of shapes between a first shape and a second shape;
wherein the adjustment mechanism comprises a barrel with a helical groove around an outer surface of the barrel, the adjustment mechanism further comprising a coil engaging the helical groove of the body;
wherein the extension member engages the barrel, wherein the cover assumes the first shape, the second shape or a shape between the first and second shapes based on rotation of the barrel to reposition the extension member relative to the resilient cover.

12. The mechanism of claim 11, wherein the engagement tip in the first shape has a sharper point than does the engagement tip in the second shape, the cover of the engagement tip to engage with a touch sensitive surface.

13. The mechanism of claim 11, wherein the adjustment mechanism further comprises a knob rotatably disposed at an end of a body housing the barrel, rotation of the knob causing rotation of the barrel.

14. The mechanism of claim 13, wherein rotation of the knob causes the cover of the engagement tip to actuate between the first shape and the second shape.

15. The mechanism of claim 11,
wherein the first shape has a first engagement area when the tip is engaged with a touch sensitive surface;
wherein the second shape has a second engagement area when the tip is engaged with the touch sensitive surface; and
wherein the first engagement area is larger than the second engagement area.

16. The mechanism of claim 11, wherein the engagement tip has an axial length and wherein the axial length is increased when the cover of the engagement tip is actuated from the first shape to the second shape.

17. The mechanism of claim 11, further comprising at least one conical guide to guide the extension member as the extension member advances axially into the resilient cover of the engagement tip.

18. The mechanism of claim 11, further comprising a rod extending axially to the extension member, the rod comprising radial projections that engage recesses to fix relative angular positions of the rod and the extension member.

19. The mechanism of claim 11, wherein between the first shape and the second shape, the extension member assumes a range of positions at which a shape of the engagement tip varies between relatively dull to relatively sharp.

20. The mechanism of claim 11, further comprising a button that, when actuated, axially advances the extension member into the resilient cover.

* * * * *